United States Patent [19]

Huber, Jr.

[11] Patent Number: 4,460,011
[45] Date of Patent: Jul. 17, 1984

[54] SANDBLASTING NOZZLE AND CONTROL ASSEMBLY

[76] Inventor: George H. Huber, Jr., 807 Moores La., New Castle, Del. 19720

[21] Appl. No.: 510,932

[22] Filed: Jul. 5, 1983

[51] Int. Cl.³ .................... F16L 58/10; F16K 35/02
[52] U.S. Cl. ................................ 137/375; 251/107; 251/298
[58] Field of Search .............. 251/95, 98, 101, 103, 251/104, 105, 107, 298; 137/375; 51/410

[56] References Cited

U.S. PATENT DOCUMENTS

| | | | |
|---|---|---|---|
| 428,031 | 5/1890 | Wood | 251/107 |
| 1,777,580 | 10/1930 | Russell | 251/298 |
| 1,856,138 | 5/1932 | Ruemelin | 251/298 |
| 2,835,269 | 5/1958 | Seymour | 251/104 |
| 2,852,037 | 9/1958 | Downing et al. | 251/298 |
| 2,853,266 | 9/1958 | Raleigh | 251/104 |
| 3,084,904 | 4/1963 | McGay | 251/298 |
| 3,438,388 | 4/1969 | Schenck, Jr. | 137/375 |

*Primary Examiner*—George L. Walton
*Attorney, Agent, or Firm*—Mason, Fenwick & Lawrence

[57] ABSTRACT

A control valve assembly to be assembled with a discharge nozzle of a sandblasting abrasive cleaning system or the like, comprising a valve housing having an elongated valve chamber to be connected at an inlet end to a supply conduit, a bulge formation on said housing providing a side compartment laterally communicating with the valve chamber, a circular valve seat at the discharge end of the valve chamber providing a beveled seating surface, a pivot valve member supported for movement into and from the valve chamber having a generally cylindrical valve head and beveled surface to conform to and seat tightly against the seating surface and having an elongated stem portion extending in inclined relation from the valve head, a handle controlled operating shaft journaled in the bulge formation having a linkage yoke member thereon connected to the valve member to tilt it while concurrently moving it arcuately about the shaft upon handle and shaft rotation to retract the valve member substantially fully into the side compartment to an open position disposing the stem portion substantially parallel to the longitudinal center axis of the valve chamber and to advance the valve member therefrom to closed position.

20 Claims, 6 Drawing Figures

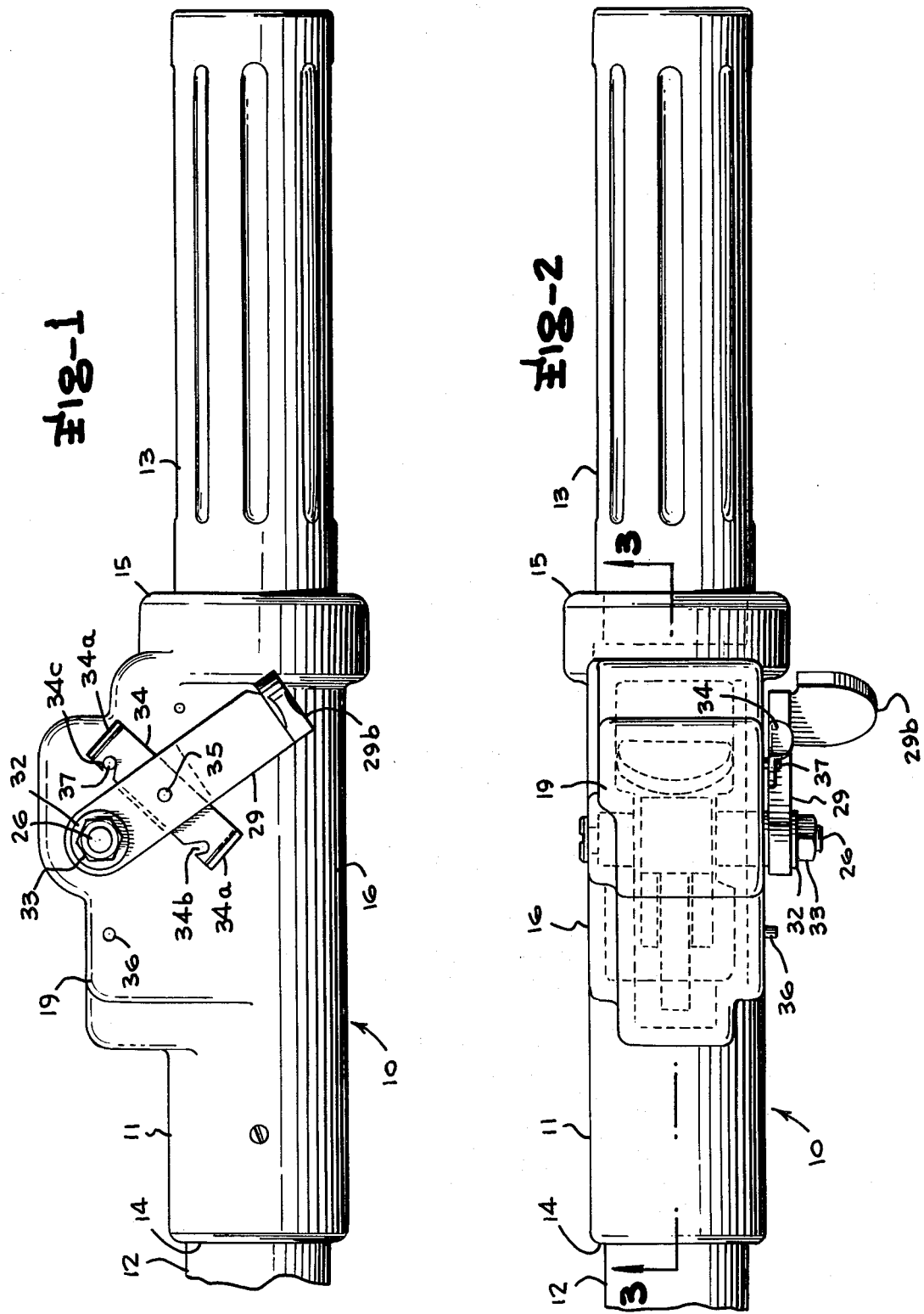

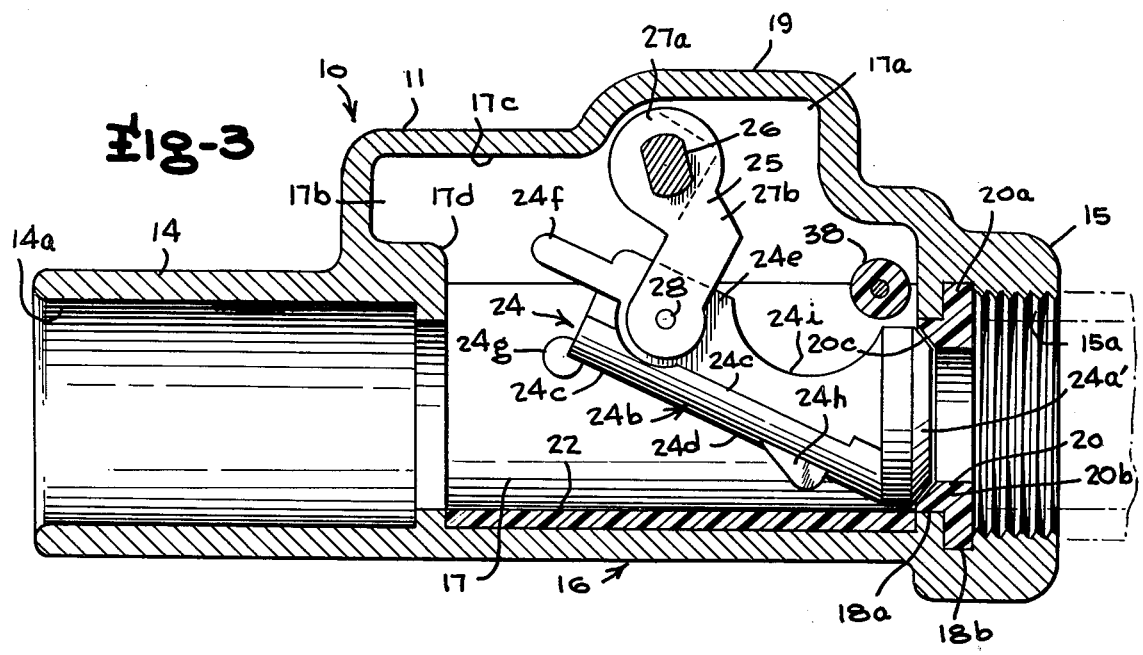
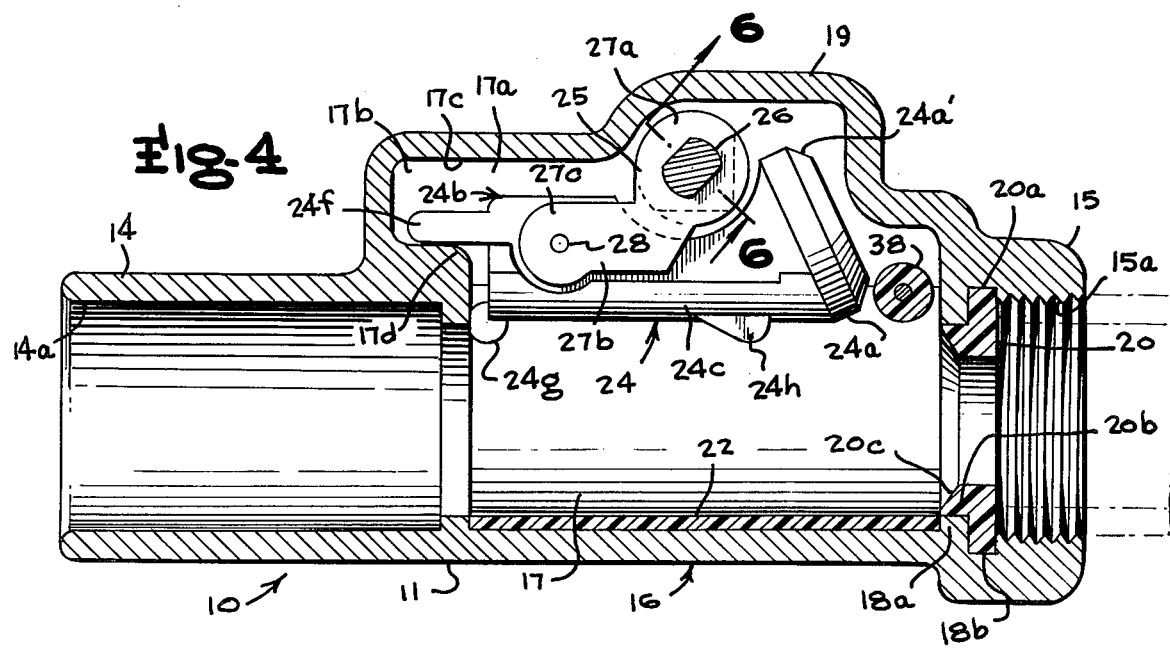

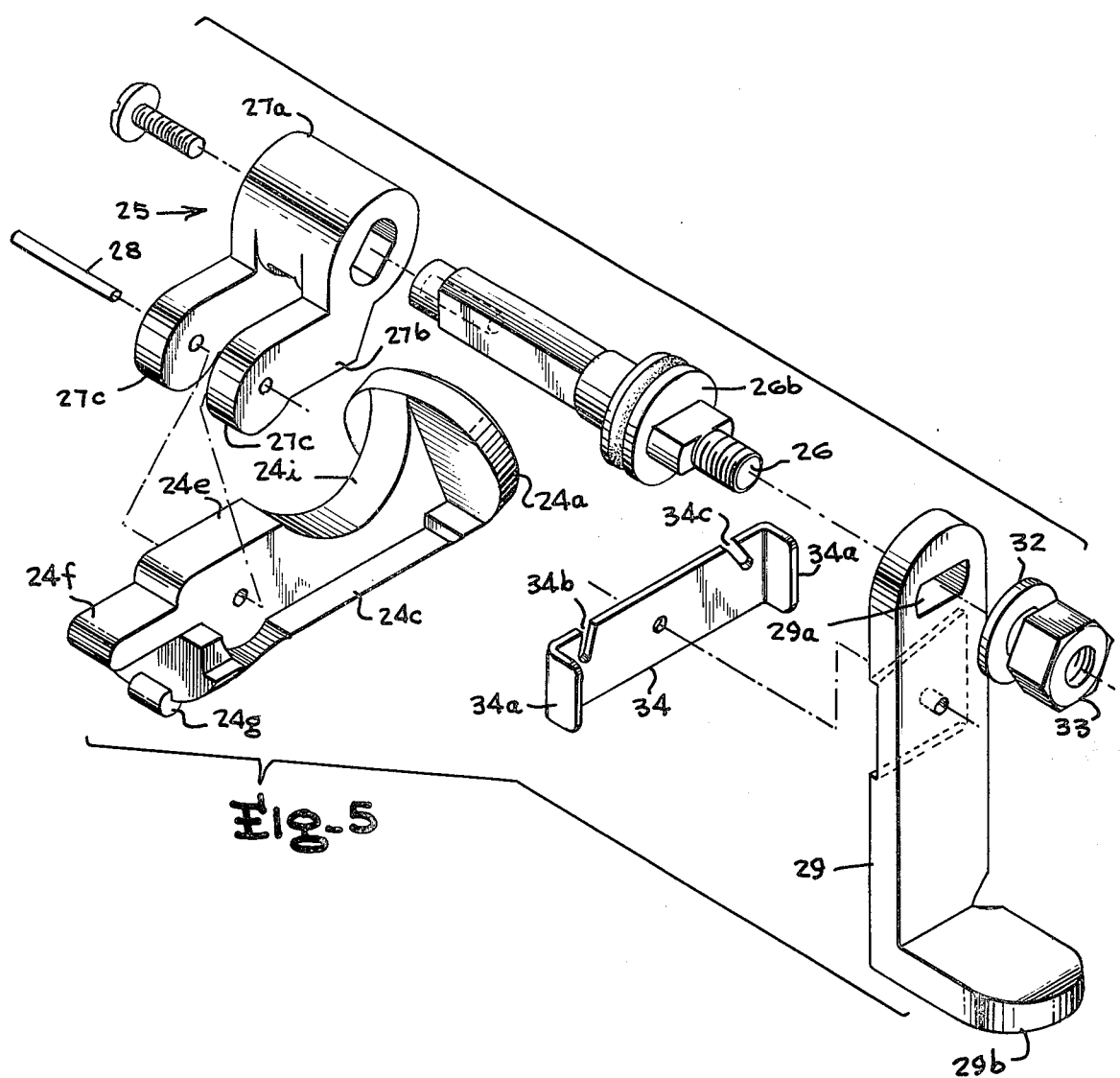
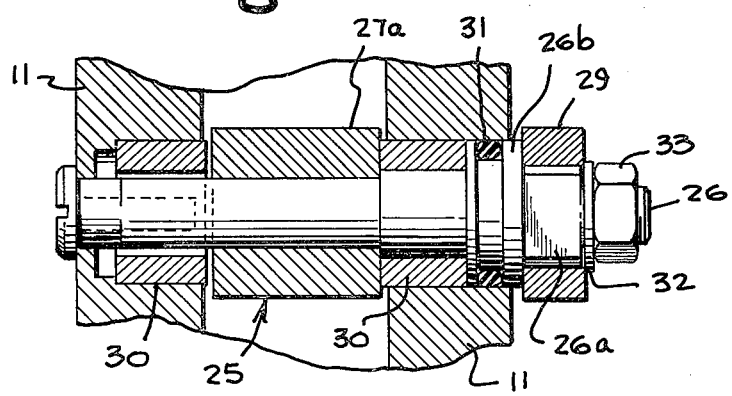

SANDBLASTING NOZZLE AND CONTROL ASSEMBLY

BACKGROUND AND OBJECTS OF THE INVENTION

The present invention relates, in general, to a nozzle and control valve assembly for pressurized abrasive cleaning systems and the like, and more particularly to a control valve structure immediately adjoining and connected to a sandblasting nozzle in a pressurized sandblasting cleaning system whereby valve control of the sandblasting stream is under control of the workman at the nozzle location adjacent the surface being sandblasted.

Heretofore, many sandblasting systems and air-water-chemical or other abrasive media systems have been devised wherein some kind of manually controllable valve structure is incorporated in the system to provide operator control of the sandblasting stream or abrasive material stream to be discharged from the associated hose and nozzle system leading from a compressor to permit operator control of the abrasive cleaning stream. However, the control valve structure has most frequently been located at the source of the compressed air and sand or other abrasive material, rather than at the nozzle or work location, because of the severe disintegration and wearing which has been encountered where attempts have been made to provide the control valve at the nozzle location or discharge stream end. Because of the highly abrasive nature of the pressurized cleaning stream being conveyed through the hose and nozzle, and therefore the severe abrasion wear on the components of valve mechanisms exposed to the abrasive stream near the nozzle end of the hose and nozzle parts of the system, it has been considered expedient to locate the control valve structure back at the upstream or source end of the hose adjacent the source of the sand and pressurized air and/or water to provide an arrangement which would have an acceptable useful work life.

The present invention is directed to provision of a control valve structure in immediate conjunction and communication with a nozzle for a sandblasting abrasive cleaning system, or similar air-water-chemical or abrasive media systems, wherein the control valve is constructed in such manner and with such materials as to be sufficiently wear resistant to the highly abrasive materials flowing in the sandblasting or abrasive pressurized stream to provide acceptably useful life and still allow control of the sandblasting or pressurized abrasive stream at the nozzle location immediately adjacent the surface being abrasively cleaned.

Another object of the present invention is the provision of a control valve structure to be associated adjacent and with a nozzle for a sandblasting or similar pressurized abrasive stream system, constructed in such a manner to allow higher volumes of air and sand or other abrasive media to pass through the valve with less wear than previous sandblasting or similar valve located near the discharge end of sandblasting hose systems, and wherein the valve structure can be used with many different types of pressurized abrasive media systems because of its high abrasion resistance and particular valve design.

Other objects, advantages and capabilities of the present invention will become apparent from the following detailed description, taken in conjunction with the accompanying drawings showing a preferred embodiment of the invention.

BRIEF DESCRIPTION OF THE FIGURES

FIG. 1 is a side elevation view of an intercoupled control valve and nozzle assembly for a sandblasting or pressurized abrasive media surface abrasion system embodying the present invention;

FIG. 2 is a top plan view thereof;

FIG. 3 is a longitudinal vertical section view taken along the line 3—3 of FIG. 2, with the valve in closed position;

FIG. 4 is a longitudinal vertical section view taken along the same plane as FIG. 3, but showing the valve in open position;

FIG. 5 is a fragmentary exploded perspective view of the valve member, the linkage yoke member, shaft and handle components; and FIG. 6 is a fragmentary transverse section view through the shaft and adjacent portions of the yoke member, valve case and handle, taken along line 6—6 of FIG. 1.

DETAILED DESCRIPTION OF A PREFERRED EMBODIMENT

Referring to the drawings, wherein like reference characters designate corresponding parts throughout the several figures, there is shown in FIGS. 1 and 2 the control valve assembly of the present invention joined to the immediately associated parts of a sandblasting abrasive cleaning system or similar air-water-chemical or abrasive media cleaning system, wherein the control valve assembly is generally indicated by the reference character 10 and comprises a valve case or housing 11 joined at one end to a pipe or sandblast hose 12 leading to pressurized supply source for the air and sand or air/water and other abrasive media and joined at the other end to a typical sandblast nozzle or discharge pipe 13 which in the illustrated embodiment has a ribbed exterior and is threaded at the end to be joined to the valve assembly case 11 to thread into the adjacent end portion of the valve case 11. In the illustrated embodiment, the valve case or housing member 11 includes a tubular cylindrical rear extension end or portion 14 defining a cylindrical well or bore 14a to receive the adjacent end portion of the supply pipe or hose 12 and the opposite end portion 15 of the valve case 11 similarly has a forwardly opening well or bore portion 15a, which in the illustrated embodiment is internally threaded, to receive the adjacent end portion of the sandblast nozzle or discharge pipe 13. Between these two end portions 14 and 15 is the intermediate valve chamber portion 16 defining a valve chamber 17 communicating at its rear end through a shouldered or slightly constricted passage with the rear end well 14a and communicating at its other end through a similar reduced diameter passage 18a and an annular groove 18b forming a valve seat supporting channel with the discharge or outlet end bore 15a. The valve case 11 has a raised or vertically extending top bulge formation 19 enclosing an upwardly extending portion 17a of the valve chamber 17 for housing the mechanism for operating the valve member and portions of the valve member when in the open position.

The valve seat, indicated by reference character 20, is an annular cylindrical member, formed for example of polyurethane, provided if desired with tungsten carbide ribs (not shown), in the general shape of a stepped annular cylinder having two outer diameters, defining a first larger diameter section 20a having a cylindrical rim sized to seat in and be restrained in the groove formation 18b of the valve seat portion 18 of the case or housing, and having a smaller outer diameter valve seating portion 20b whose outer diameter conforms to that of the constricted passage 18a of the valve housing and which has a beveled or truncated conical surface 20c bounding the opening through the valve seat member in the region of the portion 20b to define the actual seat against which the valve member presses to close the valve.

To protect the surfaces of the valve case or housing member 11 bounding the intermediate valve chamber 17 against the corrosive and abrading effects of the abrading medium, these surfaces are covered by a formed-in-place or poured-in-place valve chamber liner, for example of polyurethane or gum rubber, indicated by the reference character 22, which assumes an upwardly facing or opening "U" shaped configuration corresponding to that of the inwardly bounding surfaces of the valve chamber 17. A unique pivot valve memeber, indicated by the reference character 24, is housed in the valve chamber 17, and comprises a generally cylindrical, beveled valve head portion 24a having a truncated conical surface portion 24a' which conforms to and tightly seats against the correspondingly valve contact seat portion 20c of the valve seat member 20. Extending rearwardly at an upwardly inclined angle relative to the center axis of the head portion 24a when the valve member is viewed in closed position, is an elongated stem portion 24b, which is of substantially inverted "T" shaped cross-section defining a wider bottom portion of flange like configuration 24c having a convex bottom surface 24d whose curvature corresponds substantially to that of the projection of the perimeter of the head portion 24a along the longitudinal axis of the stem portion, and which defines a rising vertical center rib portion 24e terminating rearwardly in an elongated or rearwardly extending tail member 24f. A pair of contact feet formations 24g and 24h are also provided, the contact foot 24g being of three-quarter circular side elevation and the foot 24h being of half-tear-drop configuration in side elevation, and a concave, almost half-cylindrical cutout 24i is provided in the upper surface of the vertical center rib portion 24e immediately rearwardly of the enlarged head portion 24a shaped to receive portions of the linkage yoke or fork member 25 and of the operating shaft 26 therefor when the pivot valve member 24 is in the raised or retracted open position shown in FIG. 4.

As illustrated in the drawings, the linkage yoke member 25 comprises a cylindrical upper end portion 27a having a transverse shaped bore therethrough for receiving the operating shaft 26, and a pair of transversely spaced angle arms 27b extending therefrom terminating in apertured knuckled formations 27c for receiving a connecting pin or shaft 28 which extends through and is lightly press fit in the apertures in the knuckle formations 27c and through a transverse hole in the vertical center rib portion 24e of the pivot valve member 24 sized to permit pivoting of the valve member about the axis of the connecting pin 28. As shown in FIGS. 3 and 4, the cross-section of the transverse bore through the cylindrical end portion 27a is a circular cross-section interrupted by two flats extending along opposite, similarly spaced chords of the circle providing a non-round opening causing coordinate movement of the operating shaft 26 and linkage yoke member 25, and one end portion 26a of the shaft is provided with opposite flats producing a similar non-round configuration to be received in a similarly shaped opening 29a in a handle member 29 located outside and along one side of the valve case or housing member 11 for manual operation of the valve member.

As illustrated in FIG. 6, the middle portions of the operating shaft 26 extends through the bore in the upper cylindrical end portion 27a of the linkage yoke 25 and the opposite portions thereof flanking the yoke member 25 extend outwardly through annular bushings 30 housed in appropriate recesses formed in the opposite walls of the valve case or housing 11, and one end portion of the operating shaft 26 is provided with an enlarged cylindrical portion 26b closely approximating and journaled in the circular cross-section journaling opening therefor indicated at 11a in FIG. 6, in the valve case or housing 11, sealed by an "O"-ring 31 in an "O"-ring groove in the circular portion of the operating shaft 25, and the end portion 26a of the shaft 26 extending outwardly from that side of the valve case member 11 receives the non-round opening in the upper end portion of the handle 29, which is secured thereon by a washer 32 and nut 33 fastened on a threaded end portion of the operating shaft 26.

The handle 29 has an outwardly projecting short flange formation 29b at the lower end thereof having depressions, for example, to receive portions of the fingers of the operator to facilitate manipulation, and has a latch member 34 pivoted thereon at pivot pin 35, provided with outwardly projecting end flanges 34a and a pair of latching notches 34b, 34c near the opposite end flanges 34a. These latching notches 34b and 34c are to receive stationary latch pins 36 and 37 respectively at the open and closed positions of the valve member to latch the handle 29 and interconnected operating shaft 26, linkage yoke member 25 and pivot valve member 24 in position.

In the operation of the sand blasting or abrasive media control valve assembly of the present invention, the valve is normally in the closed position illustrated in FIG. 3 wherein the beveled cylindrical head portion 24a of the valve member 24 is seated tightly against the beveled surface portion 20c of the valve seat member 20 with the center axis of the enlarged valve head 24a aligned with the center axis of the circular opening through the valve seat member 20 and the coincident center axes of the wells or recesses 14a and 15a at the opposite ends of the valve case or housing member 11. Assuming the end portion 14 to be assembled to a supply hose or pipe 12 from the abrasive material or sand source and pressurized air and/or water source and the end portion 15 to be assembled to the sandblasting nozzle 13, the operator tilts the latch member 34 in a clockwise direction from the position illustrated in FIG. 1 to disengage the latching notch 34b from the latch pin 37, and the handle 29 is swung in a clockwise direction about the center axis of the operating shaft 26 to a position wherein the notch 34b in the latching member 34 is close to the latch pin 36. During this approximately 60° movement of the handle 29, the operating shaft 26 is rotated through the corresponding 60° angle, swinging the connecting pin 28 through a corresponding 60° arc which retracts the valve member 24 rearwardly and upwardly along a path, somewhat guided by the roller 38, to a position wherein the tail formation 24f of the valve member begins to enter the cavity or recess portion 17b of the upper extension portion 17a of valve chamber 17, whereupon the tail formation 24f engages the top wall surface portion 17c at the entrance throat to the cavity 17b, which then causes the valve member 24 to execute some counterclockwise movement about the axis of the connecting pin 28 during further rearward movement until the contact foot 24g abuts the vertical surface of valve chamber 17 immediately below stop ledge 17d which causes the valve member 24 to to fully retract into the valve chamber extension portion 17a to the open position of FIG. 2. The valve can be latched in this open position by manually tilting the latch member 34 to seat the latch pin 36 in the latch notch 34b to frictionally restrain the valve in this open position.

When it is desired to shift the valve to closed position, the latch member 34 is manually pivoted about its pin 35 to disengage the notch 34b from the latching pin 36, and the handle 29 is rotated in a counterclockwise direction back to the FIG. 1 position, whereupon it can be latched in this position by tilting the latch member 34 to engage the pin 37 in the latching notch 34c. During this closing movement of the valve assembly, the connecting pin 28 and adjacent knuckle formation portions 27c of the linkage yoke member 25 swing in a counterclockwise direction through about a 60° angle, during the first portion of which the tail formation 24f of the valve member 24 is forced against the stop ledge 17d at the lower end of the entrance portion to the cavity 17b of the valve chamber extension 17a, tilting the valve member about the axis of the connecting pin 28 in proper relation to bring its center axis into substantial alignment with the center axis of the opening through the valve seat member 20 so that it can seat properly against the beveled valve seating surfaces 20c of the valve seat. The handle 29 can then be latched in this closed position by tilting the latch member 34 to receive and frictionally restrain the latching pin 37 in the notch 34c.

I claim:

1. A control valve assembly to be disposed in immediately adjacent communication with a discharge nozzle of a sandblasting abrasive cleaning system or the like, comprising a valve housing defining an elongated valve chamber extending along a longitudinal center axis therethrough between opposite inlet and discharge ends of the housing and chamber, means for connecting the inlet end to a supply conduit for delivering an abrasive stream of pressurized fluid and sand to said valve chamber and for communicating said discharge end with the discharge nozzle, a bulge formation on said housing defining a side compartment laterally communicating with said valve chamber and having an end cavity adjacent said inlet end, valve seat means at the discharge end of the valve chamber having a circular passage concentric with said center axis communicating with the nozzle and encircled by a truncated conical seating surface, a pivot valve member supported for movement into and from said valve chamber having a generally cylindrical valve head formed about an axis of revolution coinciding with said center axis when located in closed position and providing a beveled surface to conform to and seat tightly against said seating surface to close said passage, the valve member including an elongated stem portion extending in said closed position from said valve head toward said end cavity along a path inclined to said center axis and terminating in a tail formation at the stem end nearest said end cavity, an operating shaft journaled in said bulge formation, a handle for rotating the shaft, a linkage yoke member mounted at one end thereof on said shaft and connected at its other end to said stem portion at a location adjacent said tail formation for moving the valve member between an open position, and said closed position, and guide means positioned within the valve housing for maintaining the valve member along said inclined path until said valve member clears said valve guide means during an initial retraction of said valve member from the closed position to the open position, the yoke member and tail formation being located and shaped to tilt the valve member while concurrently moving it arcuately about the shaft upon handle and shaft rotation during the remaining retraction of the valve member substantially fully into said side compartment to the open position disposing said stem portion substantially parallel to said center axis.

2. A control valve assembly as defined in claim 1, wherein said tail formation is received in said end cavity of said side compartment at said open position of the valve member and bounding surfaces of the end cavity engage said tail formation during retracting and advancing movement of the valve member to tilt the latter about the connection thereof with said yoke member.

3. A control valve assembly as defined in claim 1, wherein said stem portion of said valve member is of generally inverted "T"-shaped cross-sectional configuration providing a bottom flange formation having a downwardly convex generally cylindrical bottom surface extending concentric with the stem axis as a continuation of the cylindrical periphery of said cylindrical valve head.

4. A control valve assembly as defined in claim 3, wherein said stem portion of said valve member is of generally inverted "T"-shaped cross-sectional configuration providing a bottom flange formation having a downwardly convex generally cylindrical bottom surface extending concentric with the stem axis as a continuation of the cylindrical periphery of said cylindrical valve head.

5. A control valve assembly as defined in claim 1, wherein said stem portion has an inverted "T"-shaped cross-sectional configuration providing a center vertical web portion rising from a bottom flange formation and said linkage yoke member includes a generally cylindrical upper end portion mounted on said shaft and a pair of transversely spaced angular yoke arms extending from said cylindrical portion in laterally flanking relation to said web portion and joined thereto by a pivot member.

6. A control valve assembly as defined in claim 2, wherein said stem portion has an inverted "T"-shaped cross-sectional configuration providing a center vertical web portion rising from a bottom flange formation and said linkage yoke member includes a generally cylindrical upper end portion mounted on said shaft and a pair of transversely spaced angular yoke arms extending from said cylindrical portion in laterally flanking relation to said web portion and joined thereto by a pivot member.

7. A control valve assembly as defined in claim 3, wherein said inverted "T"-shaped cross-sectional configuration of said stem portion provides a center vertical web portion rising from said bottom flange formation and said linkage yoke member includes a generally cylindrical upper end portion mounted on said shaft and a pair of transversely spaced angular yoke arms extending from said cylindrical portion in laterally flanking relation to said web portion and joined thereto by a pivot member.

8. A control valve assembly as defined in claim 4, wherein said inverted "T"-shaped cross-sectional configuration of said stem portion provides a center vertical web portion rising from said bottom flange formation and said linkage yoke member includes a generally cylindrical upper end portion mounted on said shaft and a pair of transversely spaced angular yoke arms extending from said cylindrical portion in laterally flanking relation to said web portion and joined thereto by a pivot member.

9. A control valve assembly as defined in claim 5, wherein said web portion of the valve stem includes an upwardly concave recess along the uppermost edge thereof shaped to receive the cylindrical end portion of said yoke member nested therein when said valve member occupies said open position.

10. A control valve assembly as defined in claim 6, wherein said web portion of said valve stem portion includes an upwardly concave recess along the uppermost edge thereof shaped to receive the cylindrical end portion of said yoke member nested therein when said valve member occupies said open position.

11. A control valve assembly as defined in claim 7, wherein said web portion of said valve stem portion includes an upwardly concave recess along the uppermost edge thereof shaped to receive the cylindrical end portion of said yoke member nested therein when said valve member occupies said open position.

12. A control valve assembly as defined in claim 1, wherein said valve chamber is lined along the bottom and side portions thereof opposite and adjacent said side compartment with a poured-in-place polyurethane liner for resisting abrading of the surfaces thereof by abrasive cleaning medium passing therethrough.

13. A control valve assembly as defined in claim 2, wherein said valve chamber is lined along the bottom and side portions thereof opposite and adjacent said side compartment with a poured-in-place polyurethane liner for resisting abrading of the surfaces thereof by abrasive cleaning medium passing therethrough.

14. A control valve assembly as defined in claim 5, wherein said valve chamber is lined along the bottom and side portions thereof opposite and adjacent said side compartment with a poured-in-place polyurethane liner for resisting abrading of the surfaces thereof by abrasive cleaning medium passing therethrough.

15. A control valve assembly as defined in claim 1, wherein said guide means includes a cylindrical roller transversely spanning an entrance portion to said side compartment from said valve chamber near said valve seat means for engaging portions of said valve member adjacent and at said valve head during retraction and advancement thereof for assisting in positioning of the valve member.

16. A control valve assembly as defined in claim 2, wherein said guide means includes a cylindrical roller transversely spanning an entrance portion to said side compartment from said valve chamber near said valve seat means for engaging portions of said valve member adjacent and at said valve head during retraction and advancement thereof for assisting in positioning of the valve member.

17. A control valve assembly as defined in claim 5, wherein said guide means includes a cylindrical roller transversely spanning an entrance portion to said side compartment from said valve chamber near said valve seat means for engaging portions of said valve member adjacent and at said valve head during retraction and advancement thereof for assisting in positioning of the valve member.

18. A control valve assembly as defined in claim 8, wherein said guide means includes a cylindrical roller transversely spanning an entrance portion to said side compartment from said valve chamber near said valve seat means for engaging portions of said valve member adjacent and at said valve head during retraction and advancement thereof for assisting in positioning of the valve member.

19. A control valve assembly as defined in claim 4, wherein said stem portion includes a contact foot formation at the end of said bottom flange formation opposite said valve head and below said tail formation to engage a shaped abutment surface of the valve chamber adjoining said end cavity during retracting movement of the valve member to assist guiding the valve member to said fully retracted condition in the side compartment.

20. A control valve assembly as defined in claim 8, wherein said stem portion includes a contact foot formation at the end of said bottom flange formation opposite said valve head and below said tail formation to engage a shaped abutment surface of the valve chamber adjoining said end cavity during retracting movement of the valve member to assist guiding the valve member to said fully retracted condition in the side compartment.

* * * * *